United States Patent
Hamiti et al.

(10) Patent No.: US 8,830,946 B2
(45) Date of Patent: Sep. 9, 2014

(54) METHOD AND APPARATUS OF PROVIDING A FRAME STRUCTURE FOR SUPPORTING DIFFERENT OPERATIONAL MODES

(75) Inventors: Shkumbin Hamiti, Helsinki (FI); Kiran Kuchi, Irving, IN (US); Zexian Li, Espoo (FI); Shashikant Maheshwari, Irving, IN (US); Xin Qi, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 987 days.

(21) Appl. No.: 12/739,161

(22) PCT Filed: Oct. 24, 2008

(86) PCT No.: PCT/IB2008/054413
§ 371 (c)(1),
(2), (4) Date: Sep. 13, 2010

(87) PCT Pub. No.: WO2009/053943
PCT Pub. Date: Apr. 30, 2009

(65) Prior Publication Data
US 2011/0090879 A1   Apr. 21, 2011

Related U.S. Application Data

(60) Provisional application No. 60/982,255, filed on Oct. 24, 2007.

(51) Int. Cl.
*H04W 4/00* (2009.01)
*H04B 7/26* (2006.01)
*H04L 5/00* (2006.01)
*H04L 7/04* (2006.01)
*H04L 27/26* (2006.01)

(52) U.S. Cl.
CPC ............ *H04B 7/2656* (2013.01); *H04L 5/0007* (2013.01); *H04L 7/041* (2013.01); *H04L 27/2602* (2013.01)
USPC .......................................... 370/330; 370/343

(58) Field of Classification Search
CPC ..... H04L 7/041; H04L 5/007; H04L 27/2602; H04B 7/2656
USPC ......... 370/328–330, 343, 345, 348, 350, 436, 370/442, 461, 462, 464, 468, 478, 480, 498, 370/503, 509, 512
See application file for complete search history.

(56) References Cited

U.S. PATENT DOCUMENTS 7,400,643 B2 *  7/2008  Hansen et al. ................ 370/465
(Continued)

FOREIGN PATENT DOCUMENTS

EP           1 603 277 A1    12/2005
WO    WO 2006/069176 A2     6/2006
WO    WO 2006/086584 A2     8/2006

OTHER PUBLICATIONS

IEEE Standard for Information Technology (802.11)—Telecommunications and Information Exchange Between Systems—Local and Metropolitan Area Networks—Specific Requirement, Part 11: Wireless LAN Medium Access Control (MAC) and Physical Layer (PHY) Specifications; IEEE Computer Society; Sponsored by the LAN/MAN Standards Committee, Jun. 12, 2007.

(Continued)

*Primary Examiner* — Huy D Vu
*Assistant Examiner* — Kuo T Chiang
(74) *Attorney, Agent, or Firm* — Harrington & Smith

(57) ABSTRACT

An approach provides a frame structure for supporting different operational modes. A frame is generated for transmission over a network to a first device and a second device over a first bandwidth and a second bandwidth, respectively. The preamble provides synchronization for operation over the first bandwidth and the second bandwidth.

22 Claims, 17 Drawing Sheets

(56) References Cited

U.S. PATENT DOCUMENTS

| | | | |
|---|---|---|---|
| 7,751,364 B2 * | 7/2010 | Won et al. | 370/329 |
| 7,885,214 B2 * | 2/2011 | Ahmadi et al. | 370/295 |
| 8,077,696 B2 * | 12/2011 | Izumi et al. | 370/350 |
| 8,238,919 B2 * | 8/2012 | Rydnell et al. | 455/437 |
| 2005/0190724 A1 | 9/2005 | Hansen et al. | 370/329 |

OTHER PUBLICATIONS

IEEE Standard for Local and Metropolitan Area Networks (802.16)—Part 16: Air Interface for Fixed Broadband Wireless Access Systems; IEEE Computer Society and the IEEE Microwave Theory and Techniques Society; Sponsored by the LAN/MAN Standards Committee, Oct. 1, 2004.

* cited by examiner

METHOD AND APPARATUS OF PROVIDING A FRAME STRUCTURE FOR SUPPORTING DIFFERENT OPERATIONAL MODES

RELATED APPLICATIONS

This application claims the benefit of the earlier filing date under 35 U.S.C. §119(e) of U.S. Provisional Application Ser. No. 60/982,255 filed Oct. 24, 2007, entitled "Method and Apparatus for Providing a Frame Structure for Supporting Different Operational Modes," the entirety of which is incorporated herein by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves backward compatibility of communication devices. Given the rapid development of new services and features, it is no surprise that the development cycle of handsets continues to be shortened. To mitigate obsolescence of these devices as well as network elements (e.g., base stations) that support them, manufacturers need to address compatibility issues—namely, backward compatibility.

SOME EXEMPLARY EMBODIMENTS

Therefore, there is a need for an approach for ensuring compatibility among different network devices.

According to one embodiment of the invention, a method comprises generating a frame for transmission over a network to a first device and a second device. The frame includes a preamble to provide operational compatibility with the first device and the second device over a first bandwidth and a second bandwidth, respectively. The preamble provides synchronization for operation over the first bandwidth and the second bandwidth.

According to another embodiment of the invention, an apparatus comprises logic configured to generate a frame for transmission over a network to a first device and a second device over a first bandwidth and a second bandwidth, respectively. The preamble provides synchronization for operation over the first bandwidth and the second bandwidth.

According to another embodiment of the invention, a method comprises receiving a frame over a network. The frame includes a preamble to provide compatibility with a plurality of operational modes. A first portion of the preamble provides synchronization as to operate at a first bandwidth, and a second portion of the preamble provides synchronization as to operate at a second bandwidth.

According to yet another embodiment of the invention, an apparatus comprises logic configured to receive a frame over a network, the frame including a preamble to provide compatibility with a plurality of operational modes. A first portion of the preamble provides synchronization as to operate at a first bandwidth, and a second portion of the preamble provides synchronization as to operate at a second bandwidth.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION

An apparatus, method, and software for generating a frame structure that enables use of different operational modes are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network having an architecture that is compliant with Institute of Electrical & Electronics Engineers (IEEE) 802.16m and 802.16e, it is recognized by one of ordinary skill in the art that the embodiments of the inventions have applicability to any type of packet based communication system and equivalent functional capabilities.

Figure 1A:
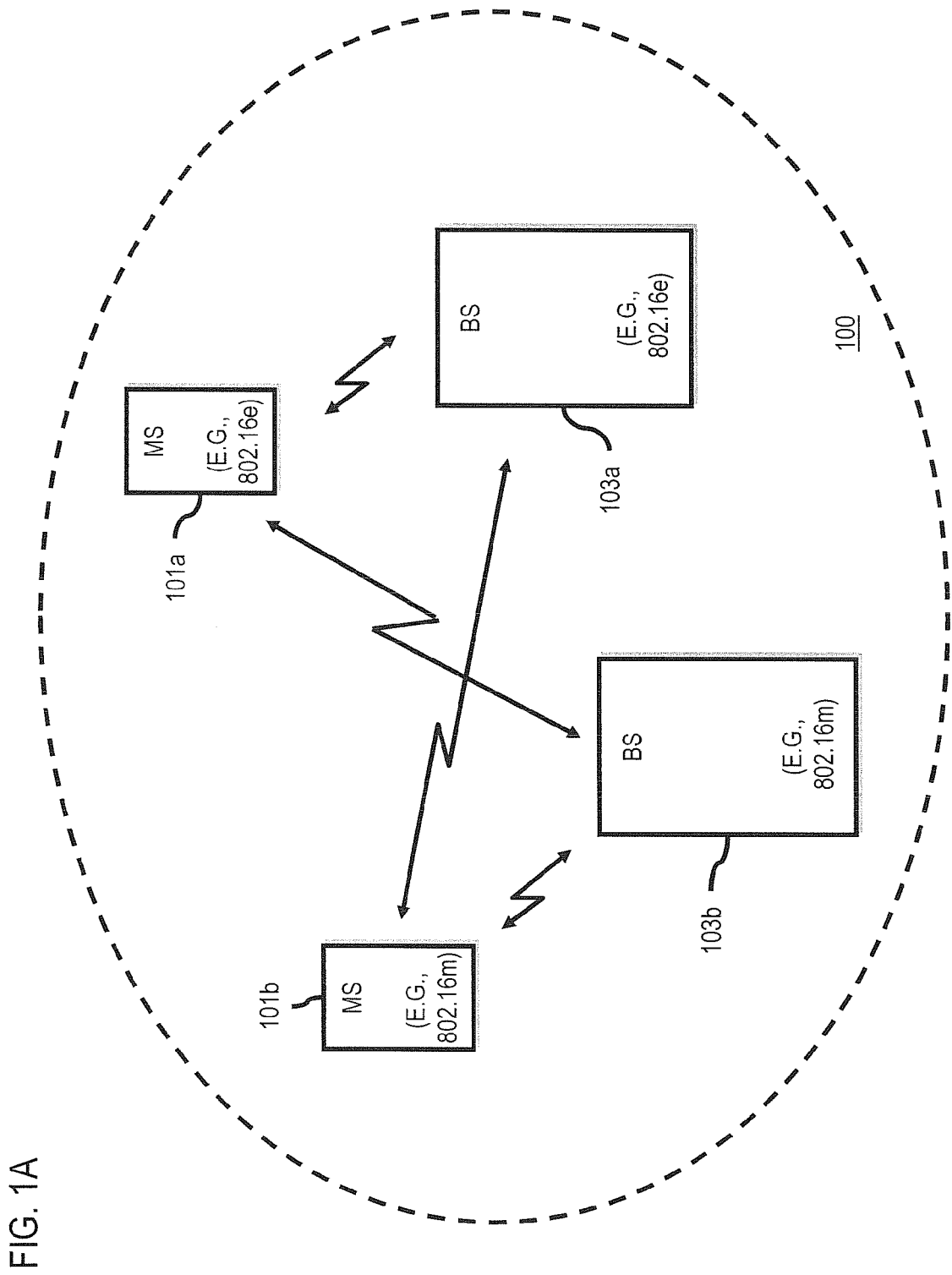
FIGS. 1A and 1B are diagrams of a communication system capable of providing a frame structure that enables use of different operational modes, according to various exemplary embodiments of the invention.
Figure 1B:
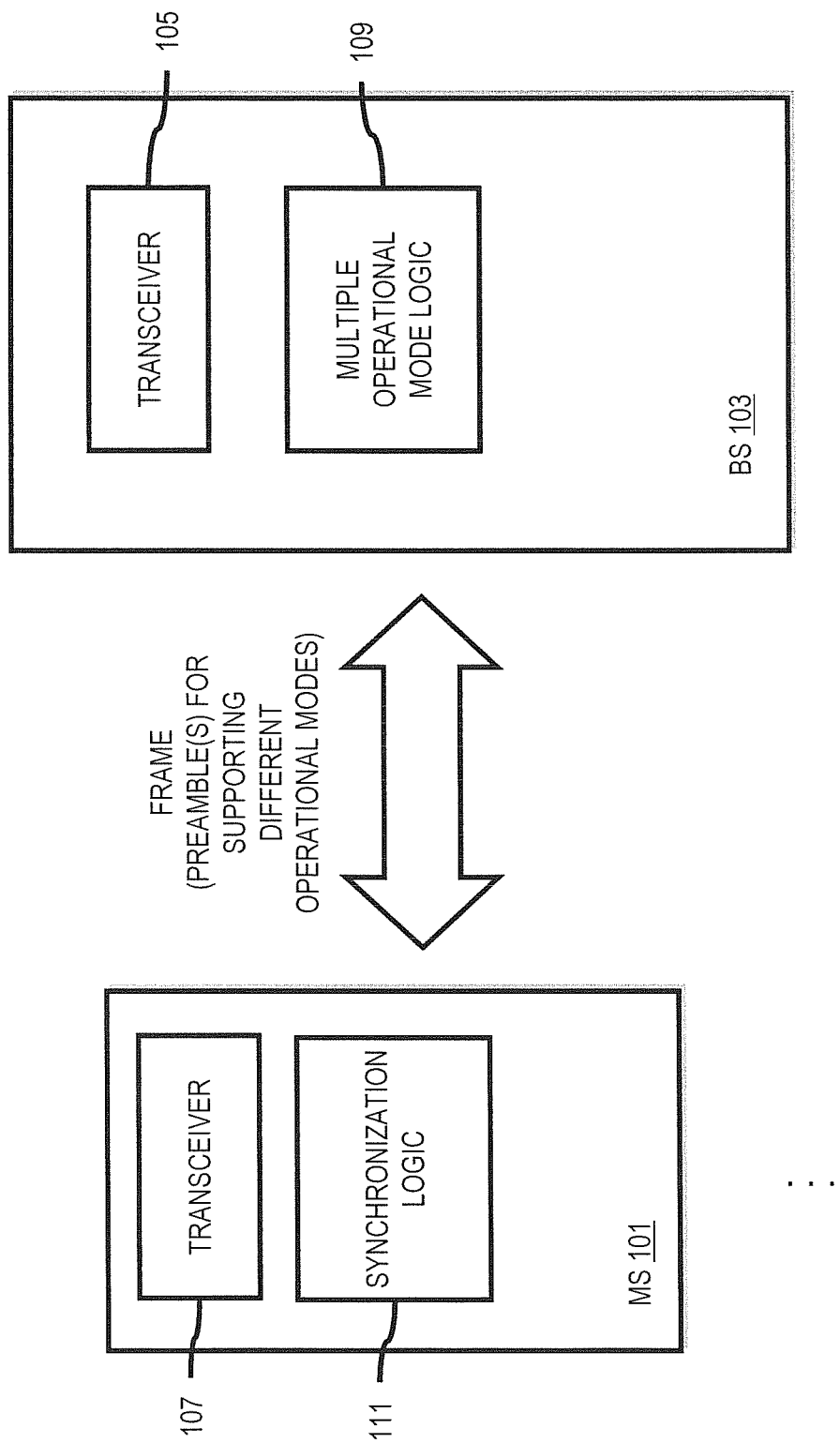

FIGS. 1A and 1B are diagrams of a communication system capable of providing a frame structure that enables use of different operational modes, according to various exemplary embodiments of the invention. As shown in FIG. 1A, a communication system 100 includes nodes 101, 103 of various types of network element, such as user equipment (UE), handsets, terminals, mobile stations, base stations, units, devices, or any type of interface to the user (such as "wearable" circuitry, etc.). By way of example, one of the nodes is a user equipment or subscriber station (SS) and one of the nodes is a base station; these nodes can communicate according to an air interface defined by IEEE 802.16, for example. Also, it is contemplated that the system 100 can constitute an access network (e.g., 3GPP LTE (or E-UTRAN), WiMAX, etc.). For example, under the 3GPP LTE architecture (as shown in FIGS. 9A-9D), the base station 103 is denoted as an enhanced Node B (eNB).

According to certain embodiments, the system 100 provides backward compatibility for devices (e.g., mobile stations 101a, 101b) of differing capabilities and functions. According to one embodiment, the devices 101 include an IEEE 802.16e device 101a ("legacy device") and an IEEE 802.16m device 101b ("new device"). As such, the base station 103a, which supports the legacy device 101a, is denoted a "legacy base station," while base station 103b that serves the capabilities of the new device 101b can be referred to as a "new base station." In an exemplary embodiment, the legacy MS 101a and BS 103a are compliant with the WirelessMAN Orthogonal Frequency Division Multiple Access (OFDMA) Reference System. Also, the new mobile station 101b and base station 103b are compliant with the IEEE 802.16 WirelessMAN OFDMA specification specified by IEEE 802.16-2004 and amended by IEEE 802.16e-2005 and IEEE 802.16m (which are incorporated herein by reference in their entireties), according to certain embodiments.

In the system 100 of FIG. 1A, the mobile stations 101 and the base stations 103 exhibit a variety of characteristics. For instance, the IEEE 802.16m MS 101b can also operate with the BS 103a that is configured for operation with the IEEE 802.16e device 101a, at a level of performance equivalent to that of the IEEE 802.16e MS 101a. Also, the systems based on IEEE 802.16m and a WirelessMAN-OFDMA reference system can operate on the same RF carrier, with the same channel bandwidth; also the systems can operate on the same radio frequency (RF) carrier with different channel bandwidths. The IEEE 802.16m BS 103b can support a mix of IEEE 802.16m and 802.16e MSs when both are operating on the same RF carrier. The system performance associated with such an arrangement improves for the IEEE 802.16m MSs 101a, 101b attached to the BS 103a, 103b. The IEEE 802.16m BS 103b also supports handover (HO) of a legacy MS 101a to and from legacy BS 103a and to and from IEEE 802.16m BS, at a level of performance equivalent to handover (HO) between two legacy BSs 103a, 103b. Additionally, the IEEE 802.16m BS 103b can support a legacy MS 101a, while serving IEEE 802.16m MSs on the same RF carrier, at a level of performance equivalent to that a legacy BS 103a provides to a legacy MS 101a.

As seen in FIG. 1B, the base station 103 employs a transceiver 105, which transmits information to the MS 101 via one or more antennas (not shown) for transmitting and receiving electromagnetic signals. The MS 101, likewise, employs a transceiver 107 to receive such signals. For instance, the base station 103 may utilize a Multiple Input Multiple Output (MIMO) antenna system for supporting the parallel transmission of independent data streams to achieve high data rates between the MS 101 and base station 103. The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands. The base station 103, in another exemplary embodiment, uses OFDM (Orthogonal Frequency Divisional Multiplexing) for both downlink (DL) and uplink (UL) transmissions.

As mentioned, the MS 101 and BS 103 operate according to IEEE 802.16. IEEE 802.16 supports a number of channel coding schemes, including convolutional code (CC), convolutional turbo code (CTC), block turbo code (BTC) and low-density parity check (LDPC) code. These coding schemes support chase combining hybrid Automatic Repeat Request (ARQ) (HARQ) scheme; CC and CTC support incremental redundancy (IR) HARQ. Automatic Repeat Request (ARQ) is an error detection mechanism used on the link layer. This mechanism permits a receiver to indicate to the transmitter that a packet or sub-packet has been received incorrectly, and thus, requests the transmitter to resend the particular packet(s). In the system 100, either of the MS 101 or BS 103 can behave as a receiver or transmitter at any particular time.

To ensure compatibility with devices (e.g., mobile stations) of differing capabilities, the BS 103 utilizes a multiple operation mode logic 109 to generate a frame that can be handled by the MS 101. The MS 101 employs a synchronization logic 111 to synchronize operations of the MS 101 with the network.

Figure 2:
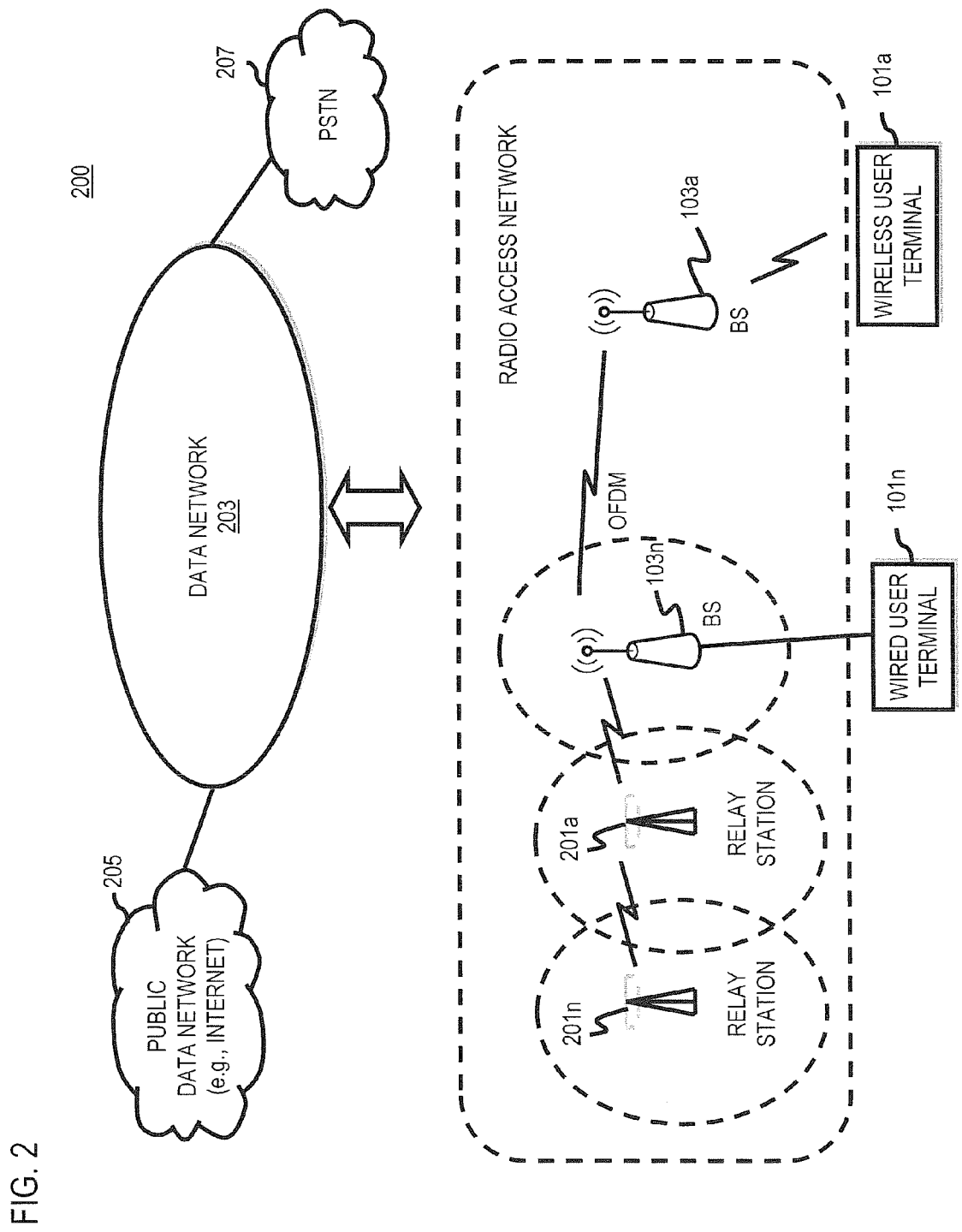
FIG. 2 is a diagram of a radio communication system for supporting devices with varying operational modes, according to various embodiments of the invention.

FIG. 2 is a diagram of a radio communication system for supporting devices with varying operational modes, according to various embodiments of the invention. For the purposes of illustration, the communication system 200 of FIG. 2 is described with respect to a wireless mesh network (WMN) using WiMAX (Worldwide Interoperability for Microwave Access) technology for fixed and mobile broadband access. WiMAX, similar to that of cellular technology, employs service areas that are divided into cells. As shown, multiple base stations 103a-103n or base transceiver stations (BTSs)—constitute the radio access network (RAN). WiMAX can operate using Line Of Sight (LOS) as well as non-LOS (NLOS). The radio access network, which comprises the base stations 103 and relay stations 201a-201n, communicates with a data network 203 (e.g., packet switched network), which has connectivity to a public data network 205 (e.g., the global Internet) and a circuit-switched telephony network 207, such as the Public Switched Telephone Network (PSTN).

In an exemplary embodiment, the communication system of FIG. 2 is compliant with IEEE 802.16. The IEEE 802.16 standard provides for fixed wireless broadband Metropolitan Area Networks (MANs), and defines six channel models, from LOS to NLOS, for fixed-wireless systems operating in license-exempt frequencies from 2 GHz to 11 GHz. In an exemplary embodiment, each of the base stations 103 uses a medium access control layer (MAC) to allocate uplink and downlink bandwidth. As shown, Orthogonal Frequency Division Multiplexing (OFDM) is utilized to communicate from one base station to another base station. For example, IEEE 802.16x defines a MAC (media access control) layer that supports multiple physical layer (PHY) specifications. For instance, IEEE 802.16a specifies three PHY options: an OFDM with 256 sub-carriers; OFDMA, with 2048 sub-carriers; and a single carrier option for addressing multipath problems. Additionally, IEEE 802.16a provides for adaptive modulation. For example, IEEE 802.16j specifies a multihop relay network, which can employ one or more relay stations to extend radio coverage.

The service areas of the RAN can extend, for instance, from 31 to 50 miles (e.g., using 2-11 GHz). The RAN can utilize point-to-multipoint or mesh topologies. Under the mobile standard, users can communicate via handsets within about a 50 mile range. Furthermore, the radio access network can support IEEE 802.11 hotspots.

The communication system of FIG. 2 can, according to one embodiment, provide both frequency and time division duplexing (FDD and TDD). It is contemplated that either duplexing scheme can be utilized. With FDD, two channel pairs (one for transmission and one for reception) are used, while TDD employs a single channel for both transmission and reception.

Figure 3:
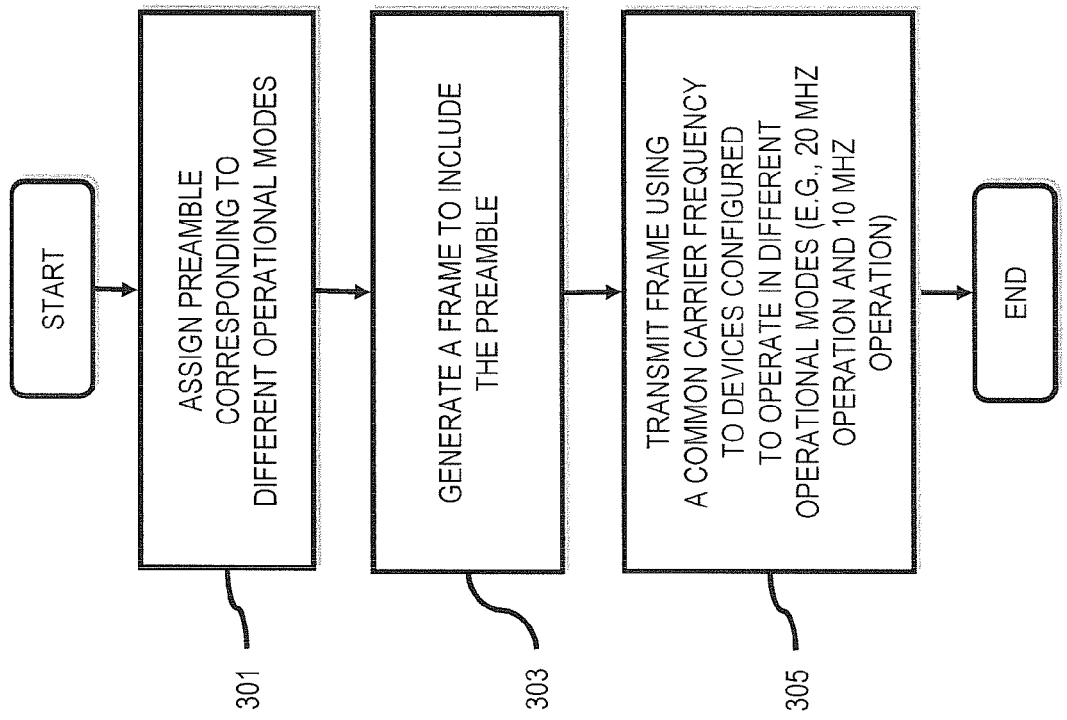
FIGS. 3-5 are flowcharts of processes for generating a frame structure that enables use of different operational modes, according to various exemplary embodiments.
Figure 4:
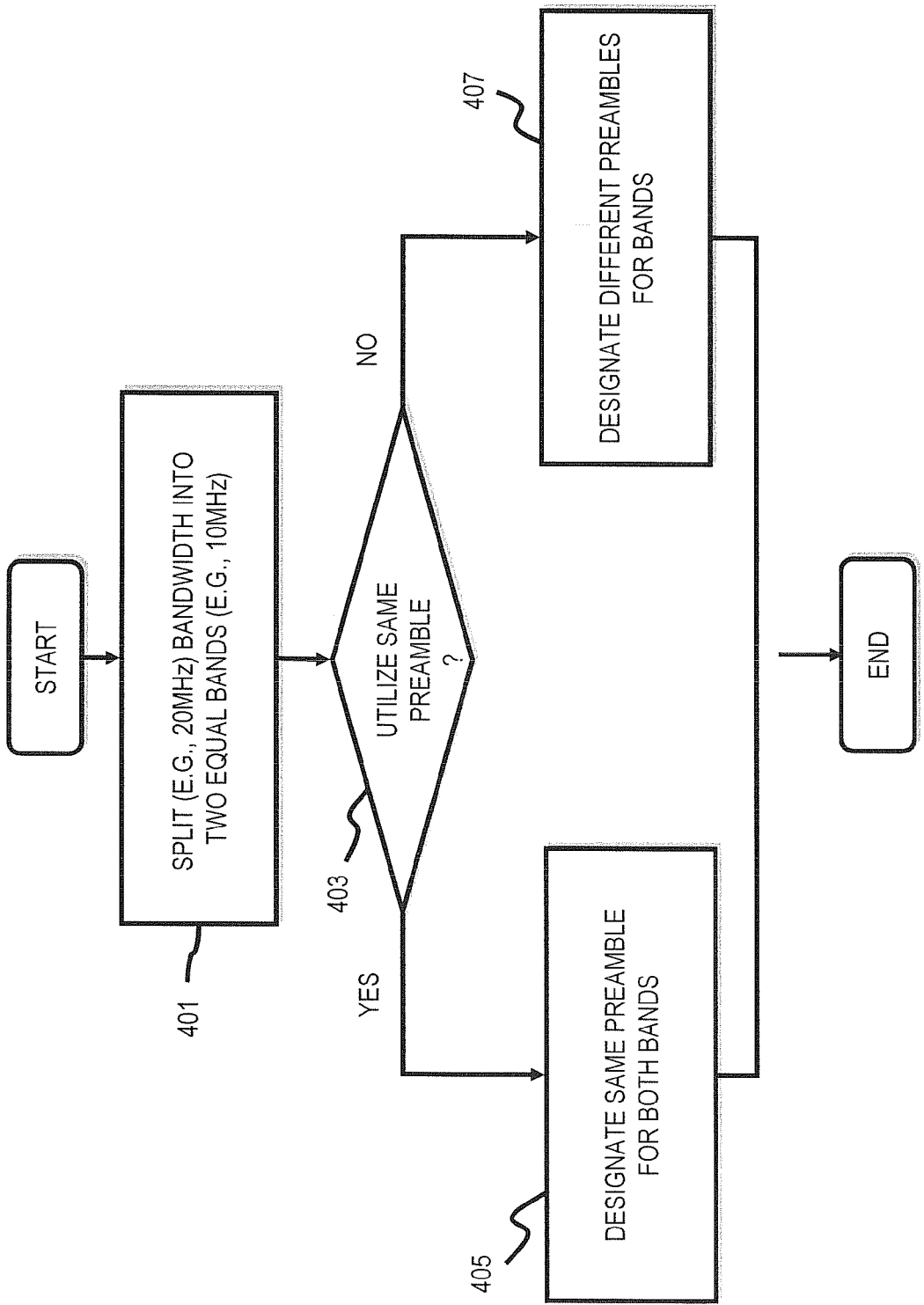
Figure 5:
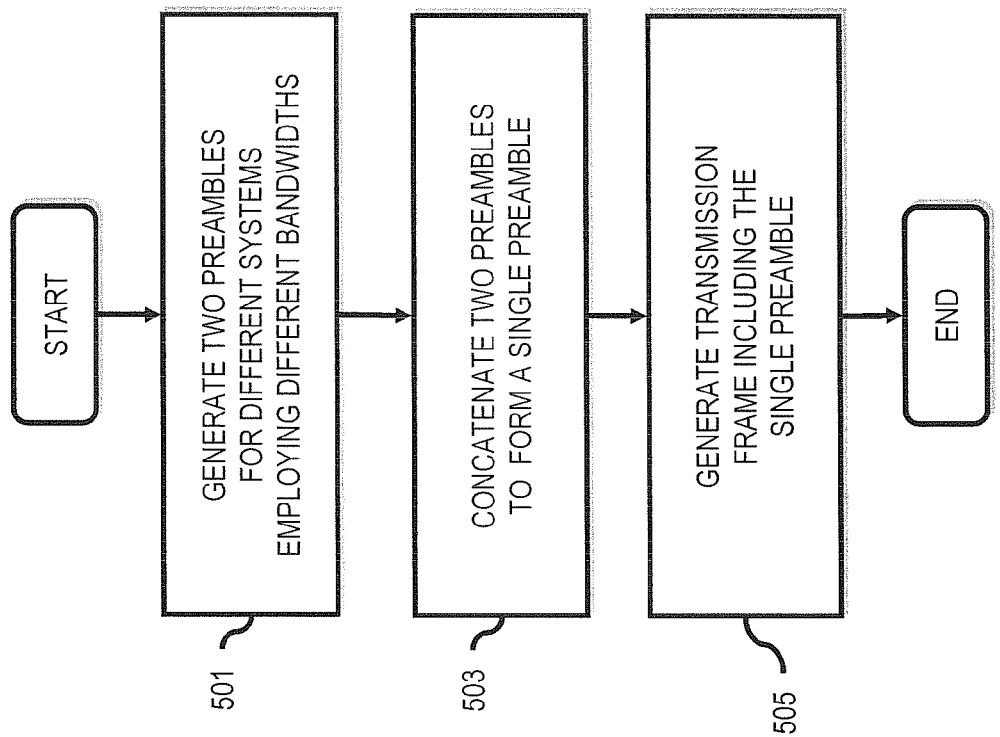

FIGS. 3-5 are flowcharts of processes for generating a frame structure that enables use of different operational modes, according to various exemplary embodiments. As shown in FIG. 3, a preamble is assigned corresponding to different operational modes, as in step 301. Conventional systems do not facilitate coexistence of devices with dissimilar bandwidths. A frame is generated to include the preamble, per step 303. By way of example, three options for the frame structure are described (with respect to FIGS. 6-8); however, it is recognized that other equivalent structures can be generated. In step 305, the frame is transmitted using a common carrier frequency to the devices (e.g., MS 101a, 101b of system 100). For example, the devices can be configured to operate in the following modes: 20 MHz operation, and 10 MHz operation.

FIG. 4 shows a flowchart of a process for partitioning bandwidth and generating an appropriate preamble for multimode operations, according to one embodiment. In step 401, bandwidth is partitioned or split in equal bands—e.g., two 10 MHz bands. The process, as in step 403, determines whether to utilize a common (i.e., the same preamble); if so, the same preamble is designated for both bands (step 405). Otherwise, the process designates different preambles for bands, per step 407.

FIG. 5 illustrates a flowchart of a process for generating a preamble to accommodate different modes of operations, according to one embodiment. In step 501, two preambles for are generated for a device operating with a first device operating with a first bandwidth (e.g., 20 MHz and 10 MHz). These preambles are then concatenated, as in step 503, to form a single preamble for another device operating with a second bandwidth. This concatenation of preambles is then used to produce a frame for transmission to the devices, per step 505.

Figure 6:
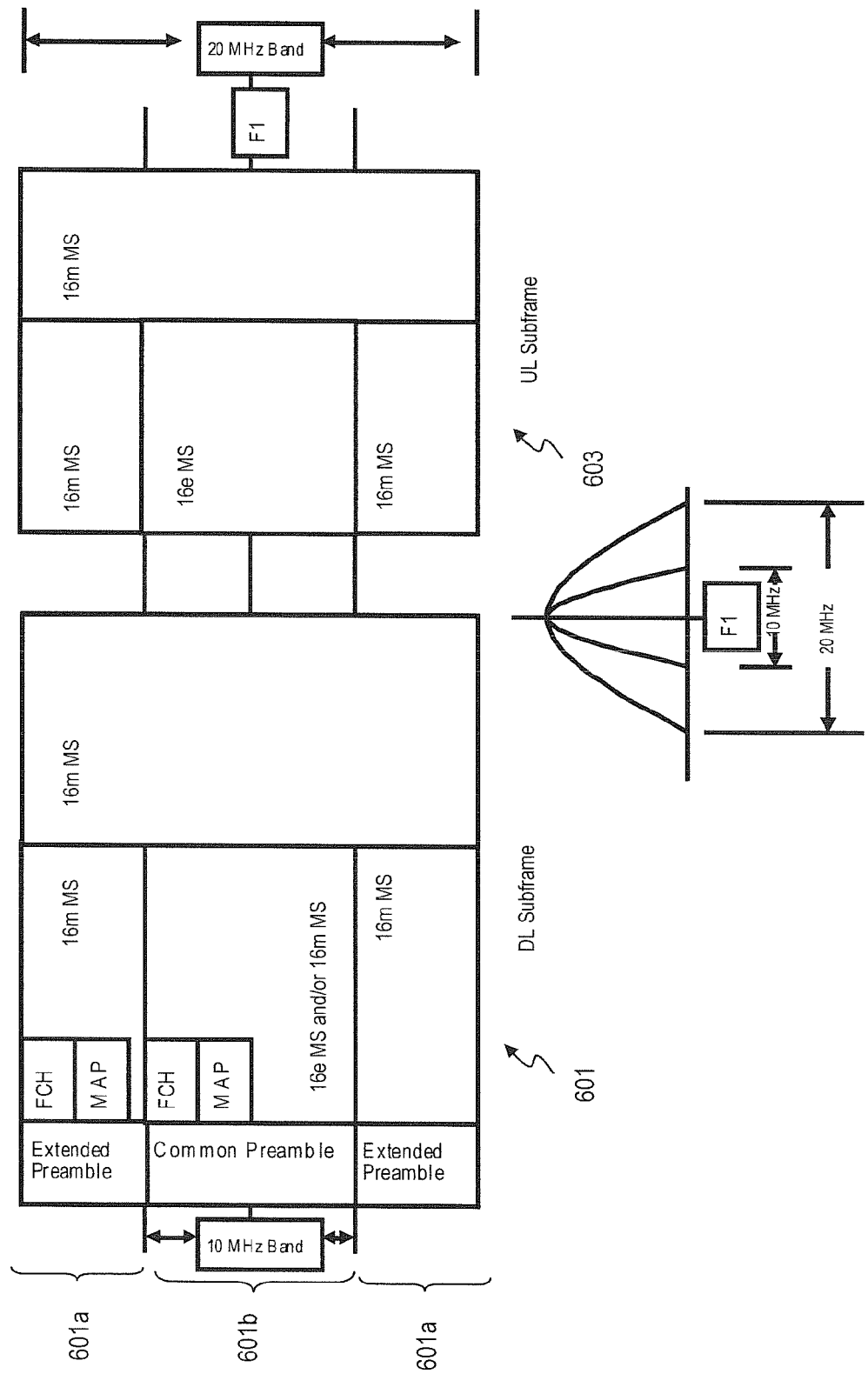
FIGS. 6-8 are exemplary frame structures generated by the processes of FIGS. 3-5, respectively, according to various exemplary embodiments.
Figure 7:
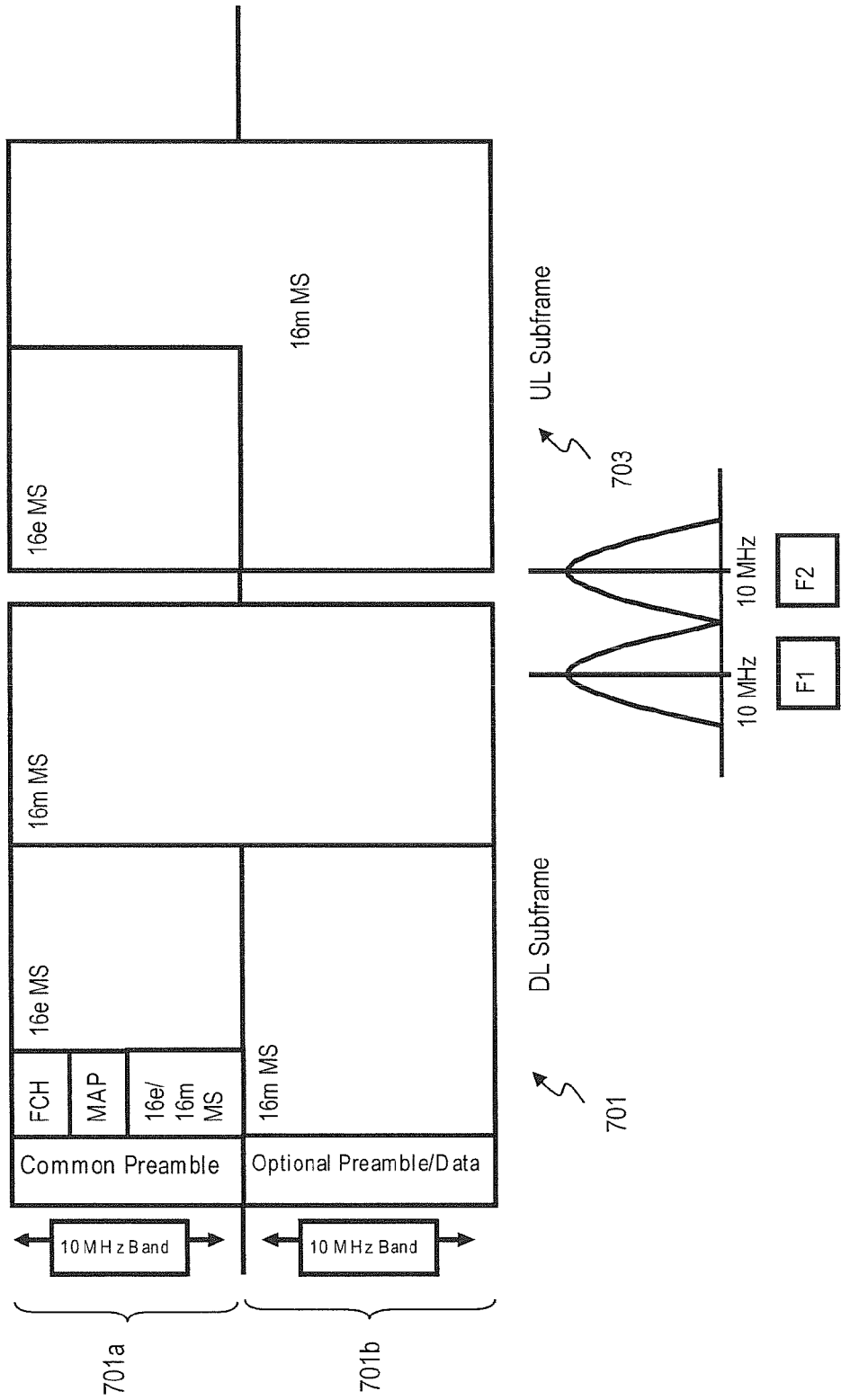
Figure 8:
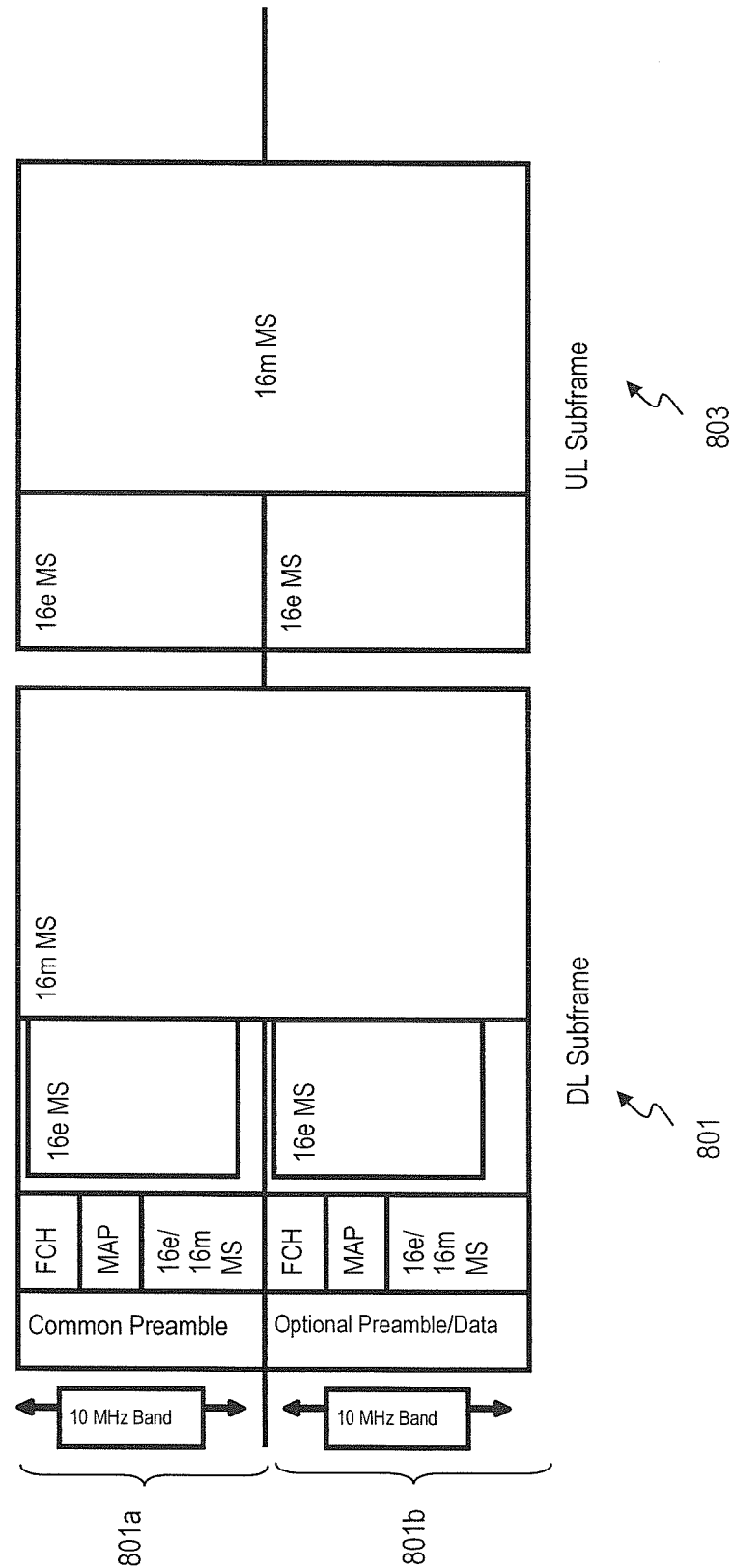

FIGS. 6-8 are exemplary frame structures generated by the processes of FIGS. 3-5, respectively, according to various exemplary embodiments. In one embodiment, the system 100 of FIG. 1A provides backward compatibility support when the legacy MS 101a, which is designed to operate in a first bandwidth (e.g., 10 MHz), enters a 802.16m network operating in 20 MHz BW. Under this scenario, a frame structure for a 20 MHz 802.16m device with backward compatibility to a 10 MHz legacy MS is introduced, as shown in FIGS. 6-8. Efficient preamble design facilitates synchronization for both 10 MHz legacy MS 101a and 20 MHz 16m MS 101b. According to certain embodiments, three distinct operational modes are provided for legacy support.

In the first case (as shown FIG. 6), a single RF carrier "F1" with 20 MHz bandwidth is employed. According to one embodiment, only a portion of, for example, a DL sub frame 601 can be allocated for the 16e MS 101a, whereas the 16m MS 101b may, in principle, be allocated the full DL sub frame (excluding the preamble, FCH, MAP portions). That is, an extended preamble portion 601a is created for the "new" device 101b, while the legacy device 101a uses a common preamble portion 601b. In this case, the center frequency for the 10 MHz legacy MS 101a is the same for the 20 MHz MS 101b. In the downlink sub frame 601, backward compatibility is ensured by allocating the legacy 16e preamble, FCH (Frame Control Header), and MAP for the 10 MHz portion as specified in the 802.16e standard. For the 20 MHz 16m MS 101b, the common (16e) preamble is further extended to cover the full 20 MHz band (with appropriate guard band allocation through null carriers). The length of the new preamble can be set to equal the used subcarriers in the 20 MHz case, such that the center part of the new defined preamble is the same as the legacy 10 MHz WiMAX preambles. In one example, the extended part of the 20 MHz preamble maintains the conjugate symmetry by extending the 10 MHz preamble. In this way, both 16m and 16e terminals can synchronize to the BS 103 using different preambles. In a sense, the 16m and 16e preambles are overlapped, but they do not interfere with each other. Further, FCH, MAP is allocated exclusively for the 16m MS 101b. By having both FCH and MAPs, 16e MS 101a can examine the 16e frame part directly, and 16m MSs 101a, 101b can directly read the 16m part. According to one embodiment, pointers can be provided within the 16m MAP indicate the location of 16e zone (in time and/or frequency).

In the uplink, (as with the DL subframe 601) a portion of an uplink sub frame 603 corresponding to the 10 MHz system may be allocated to the legacy MS 101a. An extended portion of the preamble is designated for the 20 MHz system.

As a second option (shown in FIG. 7), a frame structure is depicted whereby the MHz bandwidth is split (according to the process of FIG. 4) into two distinct 10 MHz bands each with a center frequency, e.g., "F1" and "F2", respectively. For example, with a DL subframe 701, a preamble portion 701a is common to both devices. That is, both 16e and 16m MSs 101a, 101b listen to the preamble in the first band. The same/different preamble may be transmitted in the second 10 MHz band 701b. It is noted that the FCH/MAP may not be required in the second band since the 16m MS 101b can obtain further information about the additional band either in FCH or DL-MAP or other messages in the first band. A separate zone can be created for 16m MS 101b to utilize the entire 20 MHz band. In this case, a separate MAP message for 20 MHz users can be utilized because the parameters such as guard subcarriers, subchannel structure, permutation, etc. may be different for 10 MHz and 20 MHz users.

In an UL subframe 703, the legacy device 101a is assigned one of the bands, while the new device 101b employs the entire bandwidth 101b.

In third option (shown in FIG. 8), a single preamble (e.g., a 20 MHz preamble) can be based on the concatenation of two 10 MHz preambles. For instance, a DL subframe 801 provides two separate 10 MHz bands 801a, 801b for 10 MHz terminals (e.g., device 101a) and one 20 MHz band can be supported in the 16m zones for 20 MHz terminals (e.g., device 101b). Similarly, a UL subframe 803 provides two bands for legacy devices 101a, and an entire band for the new device 101b.

Each of the above arrangements allows backward compatibility for a devices configured to operate in systems with different bandwidths (e.g., 10 MHz, 20 MHz, etc.).

As mentioned, the described processes may be implemented in any number of radio networks.

Figure 9A:
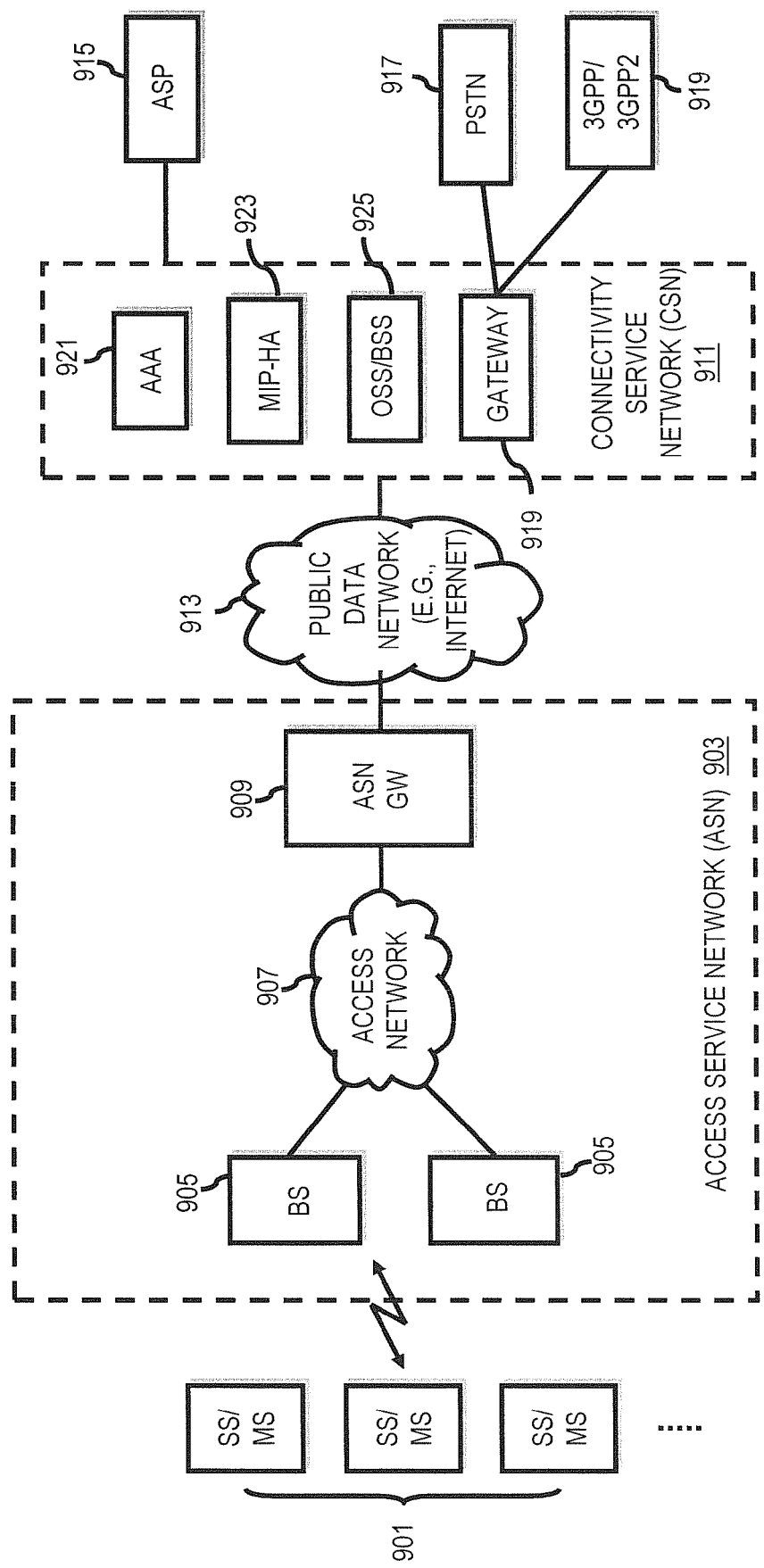
FIGS. 9A and 9B are diagrams of an exemplary WiMAX (Worldwide Interoperability for Microwave Access) architecture, in which the systems of FIGS. 1A and 1B can operate, according to various exemplary embodiments of the invention.
Figure 9B:
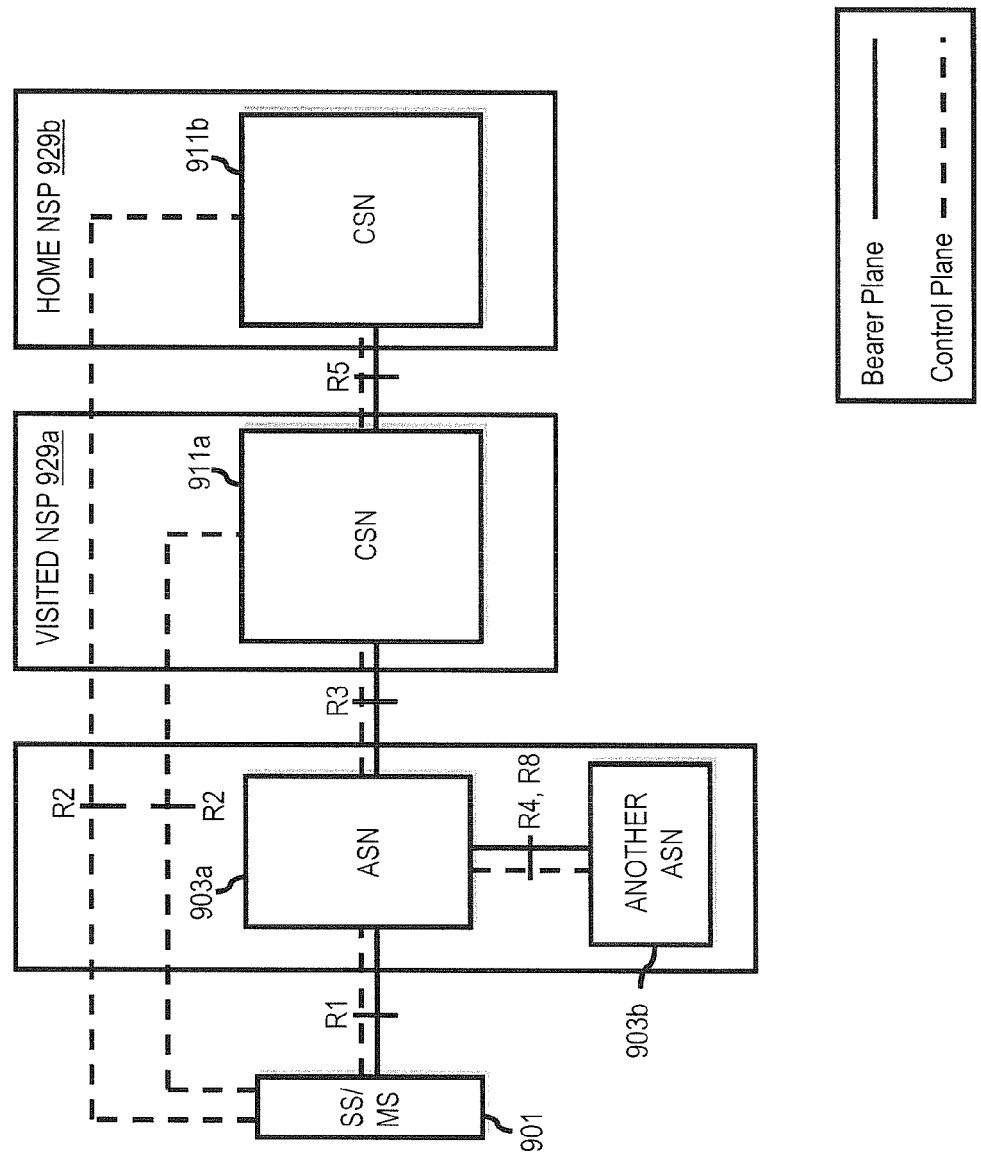

FIGS. 9A and 9B are diagrams of an exemplary WiMAX (Worldwide Interoperability for Microwave Access) architecture, in which the systems of FIGS. 1A and 1B can operate, according to various exemplary embodiments of the invention. The architecture shown in FIGS. 9A and 9B can support fixed, nomadic, and mobile deployments and be based on an Internet Protocol (IP) service model.

Subscriber or mobile stations 901 can communicate with an access service network (ASN) 903, which includes one or more base stations (BS) 905. In this exemplary system, the BS 905, in addition to providing the air interface to the mobile stations 901, possesses such management functions as hand-off triggering and tunnel establishment, radio resource management, quality of service (QoS) policy enforcement, traffic classification, DHCP (Dynamic Host Control Protocol) proxy, key management, session management, and multicast group management.

The base station 905 has connectivity to an access network 907. The access network 907 utilizes an ASN gateway 909 to access a connectivity service network (CSN) 911 over, for example, a data network 913. By way of example, the network 913 can be a public data network, such as the global Internet.

The ASN gateway 909 provides a Layer 2 traffic aggregation point within the ASN 903. The ASN gateway 909 can additionally provide intra-ASN location management and paging, radio resource management and admission control, caching of subscriber profiles and encryption keys, AAA client functionality, establishment and management of mobility tunnel with base stations, QoS and policy enforcement, foreign agent functionality for mobile IP, and routing to the selected CSN 911.

The CSN 911 interfaces with various systems, such as application service provider (ASP) 915, a public switched telephone network (PSTN) 917, and a Third Generation Partnership Project (3GPP)/3GPP2 system 919, and enterprise networks (not shown).

The CSN 911 can include the following components: Access, Authorization and Accounting system (AAA) 921, a mobile IP-Home Agent (MIP-HA) 923, an operation support system (OSS)/business support system (BSS) 925, and a gateway 927. The AAA system 921, which can be implemented as one or more servers, provide support authentication for the devices, users, and specific services. The CSN 911 also provides per user policy management of QoS and security, as well as IP address management, support for roaming between different network service providers (NSPs), location management among ASNs.

FIG. 9B shows a reference architecture that defines interfaces (i.e., reference points) between functional entities capable of supporting various embodiments of the invention. The WiMAX network reference model defines reference points: R1, R2, R3, R4, and R5. R1 is defined between the SS/MS 901 and the ASN 903a; this interface, in addition to the air interface, includes protocols in the management plane. R2 is provided between the SS/MS 901 and a CSN (e.g., CSN 911a and 911b) for authentication, service authorization, IP configuration, and mobility management. The ASN 903a and CSN 911a communicate over R3, which supports policy enforcement and mobility management.

R4 is defined between ASNs 903a and 903b to support inter-ASN mobility. R5 is defined to support roaming across multiple NSPs (e.g., visited NSP 929a and home NSP 929b).

As mentioned, other wireless systems can be utilized, such as 3GPP LTE, as next explained.

FIGS. 10A-10D are diagrams of communication systems having exemplary long-term evolution (LTE) architectures, in which the user equipment (UE) and the base station of FIG. 1 can operate, according to various exemplary embodiments of the invention. By way of example (shown in FIG. 10A), a base station (e.g., destination node) and a user equipment (UE) (e.g., source node) can communicate in system 1000 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA.

Figure 10A:
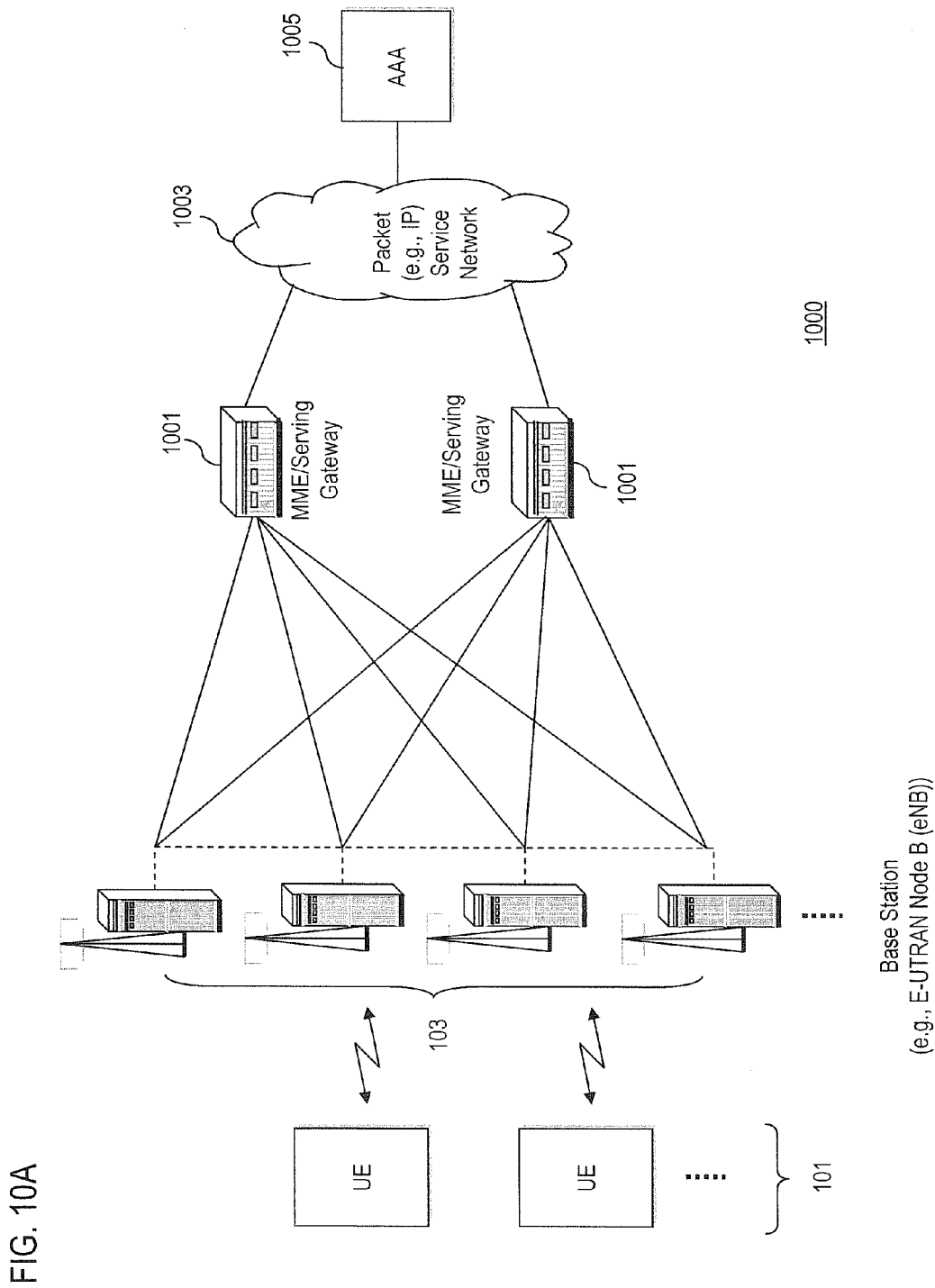
FIGS. 10A-10D are diagrams of communication systems having exemplary long-term evolution (LTE) architectures, in which the devices of FIGS. 1A and 1B can operate, according to various exemplary embodiments of the invention.

The communication system 1000 is compliant with 3GPP LTE, entitled "Long Term Evolution of the 3GPP Radio Technology" (which is incorporated herein by reference in its entirety). As shown in FIG. 10A, one or more user equipment (UEs) communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 1001 are connected to the eNBs 103 in a full or partial mesh configuration using tunneling over a packet transport network (e.g., Internet Protocol (IP) network) 1003. Exemplary functions of the MME/Serving GW 1001 include distribution of paging messages to the eNBs 103, termination of U-plane packets for paging reasons, and switching of U-plane for support of UE mobility. Since the GWs 1001 serve as a gateway to external networks, e.g., the Internet or private networks 1003, the GWs 1001 include an Access, Authorization and Accounting system (AAA) 1005 to securely determine the identity and privileges of a user and to track each user's activities. Namely, the MME Serving Gateway 1001 is the key control-node for the LTE access-network and is responsible for idle mode UE tracking and paging procedure including retransmissions. Also, the MME 1001 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 10B:
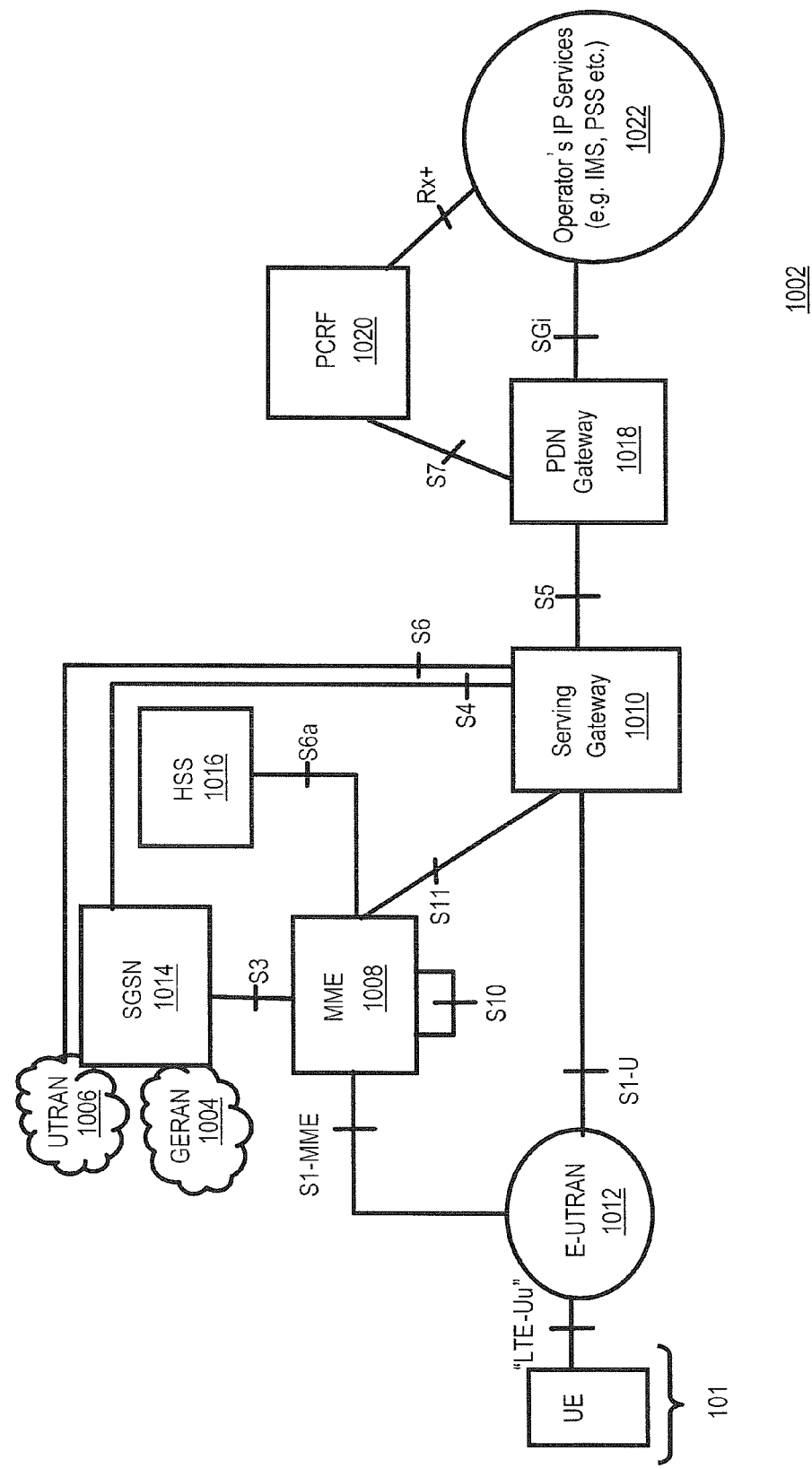

In FIG. 10B, a communication system 1002 supports GERAN (GSM/EDGE radio access) 1004, and UTRAN 1006 based access networks, E-UTRAN 1012 and non-3GPP (not shown) based access networks, and is more fully described in TR 23.882, which is incorporated herein by reference in its entirety. A key feature of this system is the separation of the network entity that performs control-plane functionality (MME 1008) from the network entity that performs bearer-plane functionality (Serving Gateway 1010) with a well defined open interface between them S11. Since E-UTRAN 1012 provides higher bandwidths to enable new services as well as to improve existing ones, separation of MME 1008 from Serving Gateway 1010 implies that Serving Gateway 1010 can be based on a platform optimized for signaling transactions. This scheme enables selection of more cost-effective platforms for, as well as independent scaling of, each of these two elements. Service providers can also select optimized topological locations of Serving Gateways 1010 within the network independent of the locations of MMEs 1008 in order to reduce optimized bandwidth latencies and avoid concentrated points of failure.

As seen in FIG. 10B, the E-UTRAN (e.g., eNB) 1012 interfaces with UE 101 via LTE-Uu. The E-UTRAN 1012 supports LTE air interface and includes functions for radio resource control (RRC) functionality corresponding to the control plane MME 1008. The E-UTRAN 1012 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 1008, as a key control node, is responsible for managing mobility UE identifies and security parameters and paging procedure including retransmissions. The MME 1008 is involved in the bearer activation/deactivation process and is also responsible for choosing Serving Gateway 1010 for the UE 101. MME 1008 functions include Non Access Stratum (NAS) signaling and related security. MME 1008 checks the authorization of the UE 101 to camp on the service provider's Public Land Mobile Network (PLMN) and enforces UE 101 roaming restrictions. The MME 1008 also provides the control plane function for mobility between LTE and 2G/3G access networks with the S3 interface terminating at the MME 1008 from the SGSN (Serving GPRS Support Node) 1014.

The SGSN 1014 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 1008 and HSS (Home Subscriber Server) 1016. The S10 interface between MMEs 1008 provides MME relocation and MME 1008 to MME 1008 information transfer. The Serving Gateway 1010 is the node that terminates the interface towards the E-UTRAN 1012 via S1-U.

The S1-U interface provides a per bearer user plane tunneling between the E-UTRAN 1012 and Serving Gateway 1010. It contains support for path switching during handover between eNBs 103. The S4 interface provides the user plane with related control and mobility support between SGSN 1014 and the 3GPP Anchor function of Serving Gateway 1010.

The S12 is an interface between UTRAN 1006 and Serving Gateway 1010. Packet Data Network (PDN) Gateway 1018 provides connectivity to the UE 101 to external packet data networks by being the point of exit and entry of traffic for the UE 101. The PDN Gateway 1018 performs policy enforcement, packet filtering for each user, charging support, lawful interception and packet screening. Another role of the PDN Gateway 1018 is to act as the anchor for mobility between 3GPP and non-3GPP technologies such as WiMax and 3GPP2 (CDMA 1x and EvDO (Evolution Data Only)).

The S7 interface provides transfer of QoS policy and charging rules from PCRF (Policy and Charging Role Function) 1020 to Policy and Charging Enforcement Function (PCEF) in the PDN Gateway 1018. The SGi interface is the interface between the PDN Gateway and the operator's IP services including packet data network 1022. Packet data network 1022 may be an operator external public or private packet data network or an intra operator packet data network, e.g., for provision of IMS (IP Multimedia Subsystem) services. Rx+ is the interface between the PCRF and the packet data network 1022.

Figure 10C:
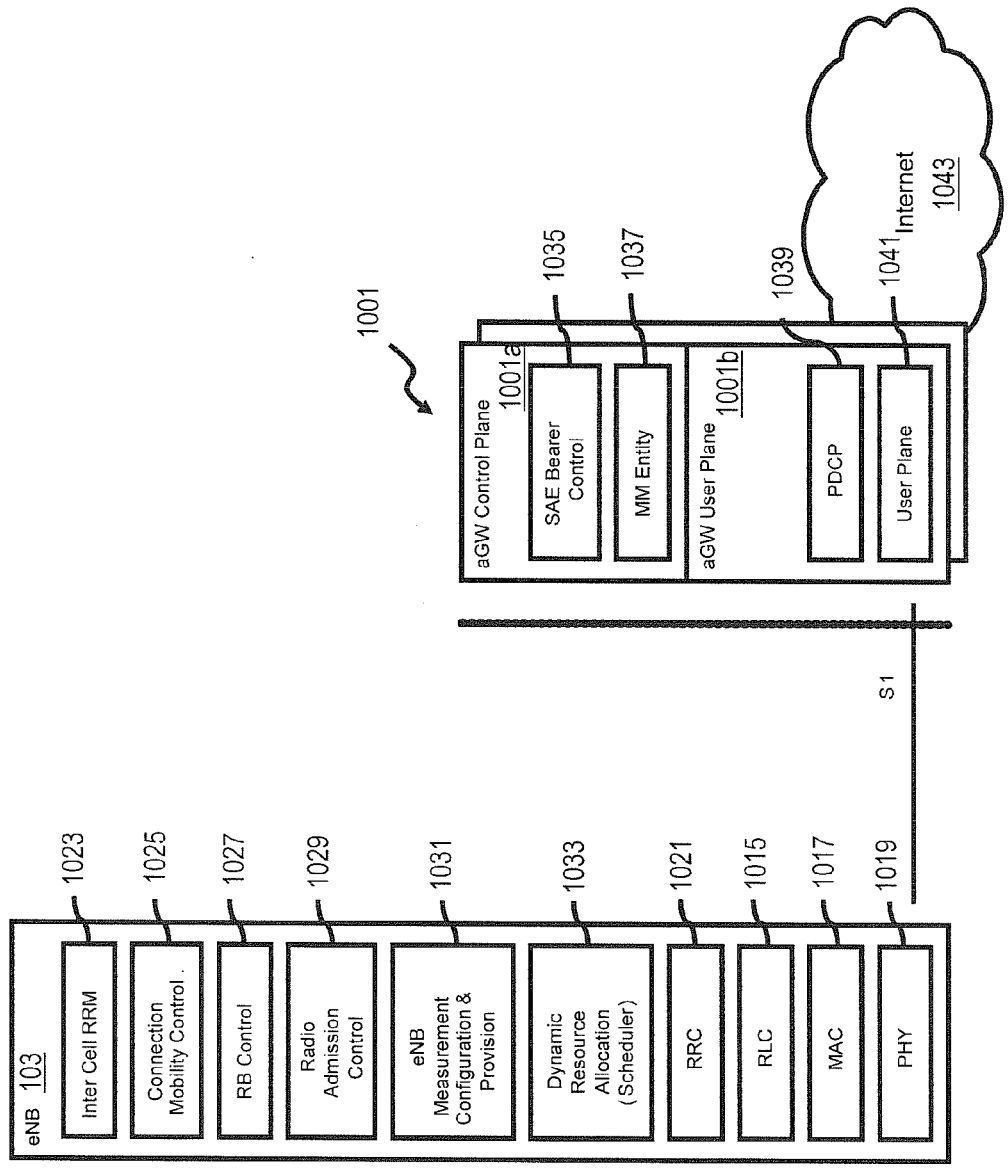

As seen in FIG. 10C, the eNB 103 utilizes an E-UTRA (Evolved Universal Terrestrial Radio Access) (user plane, e.g., RLC (Radio Link Control) 1015, MAC (Media Access Control) 1017, and PHY (Physical) 1019, as well as a control plane (e.g., RRC 1021)). The eNB 103 also includes the following functions: Inter Cell RRM (Radio Resource Management) 1023, Connection Mobility Control 1025, RB (Radio Bearer) Control 1027, Radio Admission Control 1029, eNB Measurement Configuration and Provision 1031, and Dynamic Resource Allocation (Scheduler) 1033.

The eNB 103 communicates with the aGW 1001 (Access Gateway) via an S1 interface. The aGW 1001 includes a User Plane 1001a and a Control plane 1001b. The control plane 1001b provides the following components: SAE (System Architecture Evolution) Bearer Control 1035 and MM (Mobile Management) Entity 1037. The user plane 1001b includes a PDCP (Packet Data Convergence Protocol) 1039 and a user plane functions 1041. It is noted that the functionality of the aGW 1001 can also be provided by a combination of a serving gateway (SGW) and a packet data network (PDN) GW. The aGW 1001 can also interface with a packet network, such as the Internet 1043.

Figure 10D:
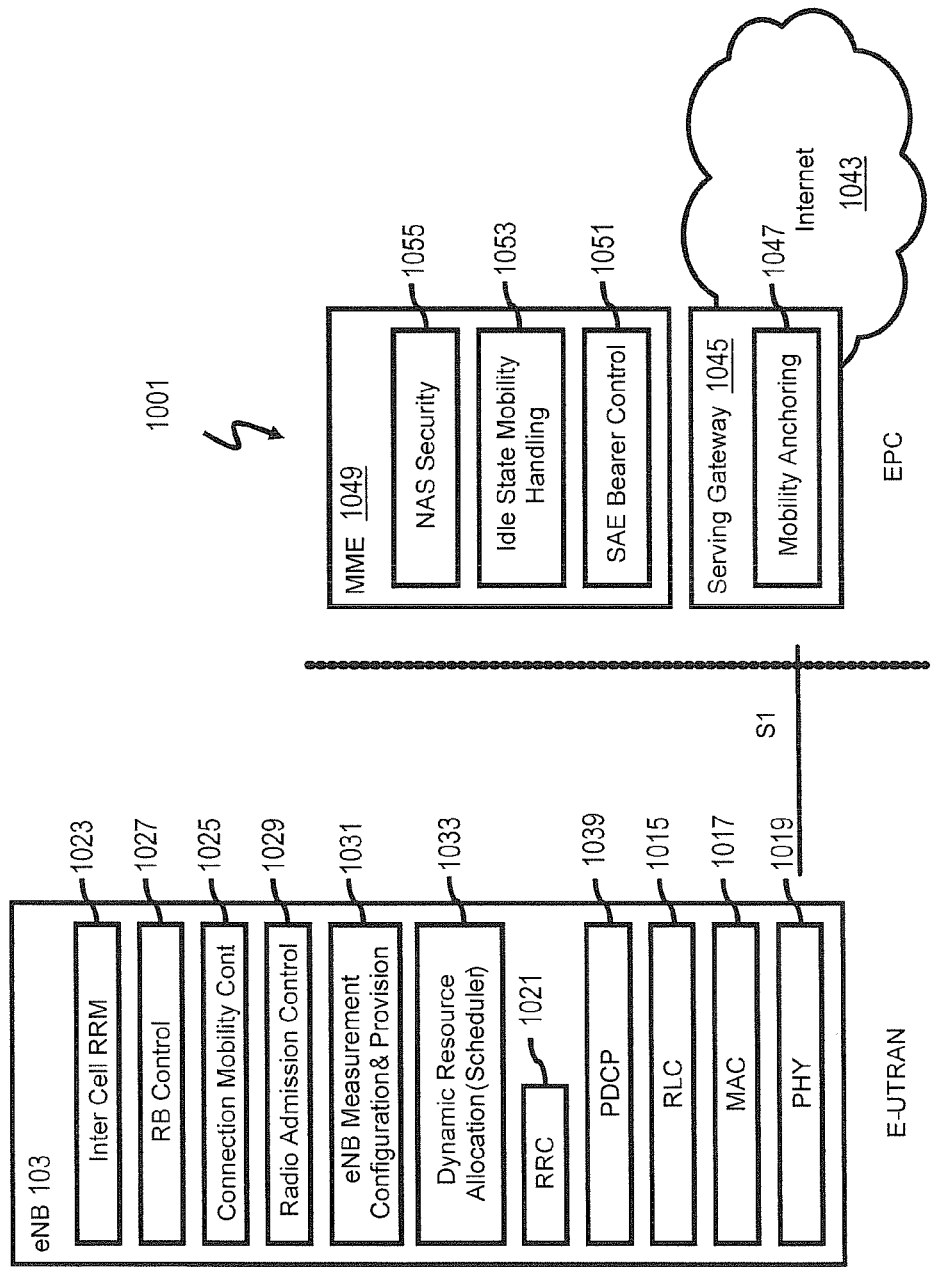

In an alternative embodiment, as shown in FIG. 10D, the PDCP (Packet Data Convergence Protocol) functionality can reside in the eNB 103 rather than the GW 1001. Other than this PDCP capability, the eNB functions of FIG. 10C are also provided in this architecture.

In the system of FIG. 10D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 86.300.

The eNB 103 interfaces via the S1 to the Serving Gateway 1045, which includes a Mobility Anchoring function 1047. According to this architecture, the MME (Mobility Management Entity) 1049 provides SAE (System Architecture Evolution) Bearer Control 1051, Idle State Mobility Handling 1053, and NAS (Non-Access Stratum) Security 1055.

One of ordinary skill in the art would recognize that the processes for providing a frame structure that enables use of different operational modes may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 11:
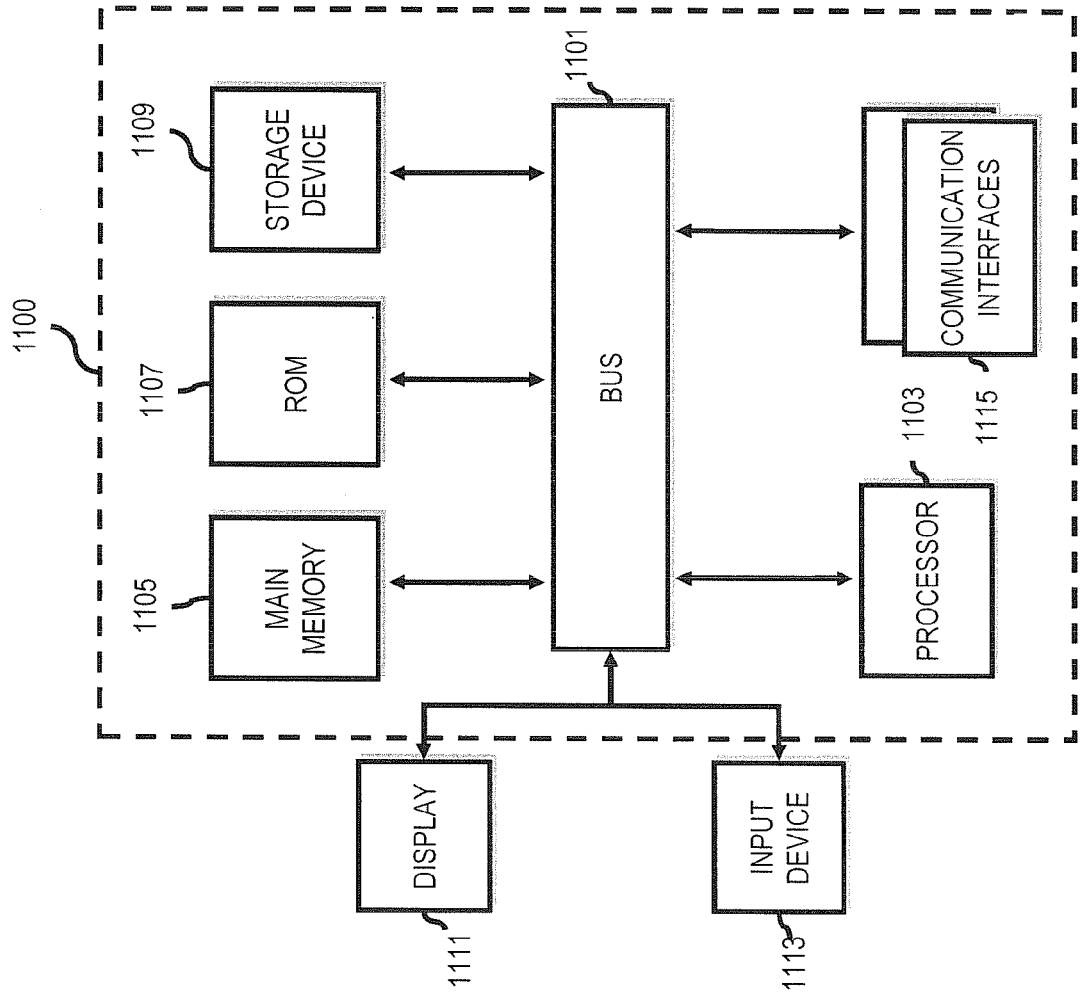
FIG. 11 is a diagram of hardware that can be used to implement an embodiment of the invention.

FIG. 11 illustrates exemplary hardware upon which various embodiments of the invention can be implemented. A computing system 1100 includes a bus 1101 or other communication mechanism for communicating information and a processor 1103 coupled to the bus 1101 for processing information. The computing system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computing system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computing system 1100 may be coupled via the bus 1101 to a display 1111, such as a liquid crystal display, or active matrix display, for displaying information to a user. An input device 1113, such as a keyboard including alphanumeric and other keys, may be coupled to the bus 1101 for communicating information and command selections to the processor 1103. The input device 1113 can include a cursor control, such as a mouse, a trackball, or cursor direction keys, for communicating direction information and command selections to the processor 1103 and for controlling cursor movement on the display 1111.

According to various embodiments of the invention, the processes described herein can be provided by the computing system 1100 in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 1100 also includes at least one communication interface 1115 coupled to bus 1101. The communication interface 1115 provides a two-way data communication coupling to a network link (not shown). The communication interface 1115 sends and receives electrical, electromagnetic, or optical signals that carry digital data streams representing various types of information. Further, the communication interface 1115 can include peripheral interface devices, such as a Universal Serial Bus (USB) interface, a PCMCIA (Personal Computer Memory Card International Association) interface, etc.

The processor 1103 may execute the transmitted code while being received and/or store the code in the storage device 1109, or other non-volatile storage for later execution. In this manner, the computing system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
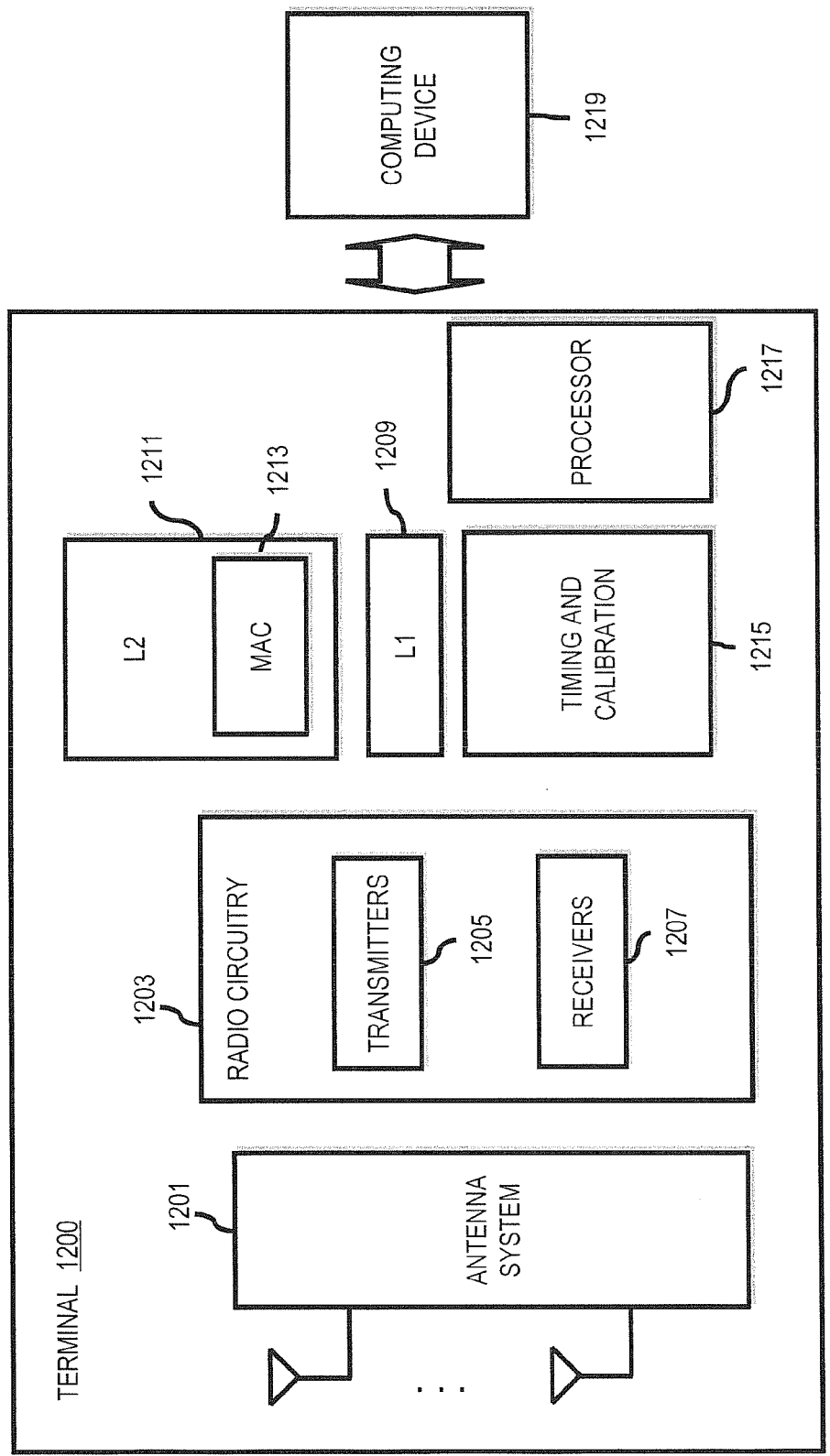
FIG. 12 is a diagram of exemplary components of a user terminal configured to operate in the systems of FIGS. 9 and 10, according to an embodiment of the invention.

FIG. 12 is a diagram of exemplary components of a user terminal configured to operate in the systems of FIGS. 8 and 9, according to an embodiment of the invention. A user terminal 1200 includes an antenna system 1201 (which can utilize multiple antennas) to receive and transmit signals. The antenna system 1201 is coupled to radio circuitry 1203, which includes multiple transmitters 1205 and receivers 1207. The radio circuitry encompasses all of the Radio Frequency (RF) circuitry as well as base-band processing circuitry. As shown, layer-1 (L1) and layer-2 (L2) processing are provided by units 1209 and 1211, respectively. Optionally, layer-3 functions can be provided (not shown). Module 1213 executes all Medium Access Control (MAC) layer functions. A timing and calibration module 1215 maintains proper timing by interfacing, for example, an external timing reference (not shown). Additionally, a processor 1217 is included. Under this scenario, the user terminal 1200 communicates with a computing device 1219, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
generating with a data processor a frame for transmission over a network to a first device and a second device, the frame including a preamble to provide operational compatibility with the first device and the second device over a first bandwidth and a second bandwidth, respectively, wherein the preamble provides synchronization for operation over the first bandwidth and the second bandwidth, and where the first bandwidth and the second bandwidth are two distinct frequency bands, where the preamble comprises a common preamble designating the same preamble for both bands in the first bandwidth, wherein the first portion of the preamble is commonly used by the first device and the second device.

2. The method according to claim 1, further comprising: transmitting the frame using a common carrier frequency.

3. The method according to claim 1, wherein the first device is configured to operate using the first bandwidth, and the second device is configured to operate using the second bandwidth or both bandwidths.

4. The method according to claim 1, wherein the frame further includes a frame control header (FCH) field and MAP field.

5. The method according to claim 1, wherein the second bandwidth is larger than that of the first bandwidth.

6. The method according to claim 5, wherein the frame corresponds to a stricture utilizing a plurality of bands, the method further comprising:
concatenating two preambles corresponding to the bands to form the preamble.

7. The method according to claim 1, wherein the first bandwidth complies with Institute of Electrical & Electronics Engineers (IEEE) 802.16e and the second bandwidth complies with IEEE 802.16m.

8. The method according to claim 1, wherein the network has a Worldwide Interoperability for Microwave Access (WiMAX) architecture.

9. The method according to claim 1, wherein the first device and the second device are mobile stations or fixed stations.

10. A non-transitory computer-readable storage medium carrying one or more sequences of one or more instructions which, when executed by one or more processors, cause the one or more processors to perform the method of claim 1.

11. An apparatus comprising:
a data processor configured to generate a frame for transmission over a network to a first device and a second device, the frame including a preamble to provide operational compatibility with the first device and the second device over a first bandwidth and a second bandwidth, respectively,
wherein the preamble provides synchronization for operation over the first bandwidth and the second bandwidth, and where the first bandwidth and the second bandwidth are two distinct frequency bands,
where the preamble comprises a common preamble designating the same preamble for both bands in the first bandwidth, wherein the first portion of the preamble is commonly used by the first device and the second device.

12. The apparatus according to claim 11, further comprising:
a transceiver configured to transmit the frame using a common carrier frequency.

13. The apparatus according to claim 11, wherein the first device is configured to operate using the first bandwidth, and the second device is configured to operate using the second bandwidth or both bandwidths.

14. The apparatus according to claim 11, wherein the frame further includes a frame control header (FCH) field and a MAP field.

15. The apparatus according to claim 11, wherein the second bandwidth is larger than that of the first bandwidth.

16. The apparatus according to claim 15, wherein the frame corresponds to a structure utilizing a plurality of bands, the logic being further configured to concatenate two preambles corresponding to the bands to form the preamble.

17. The apparatus according to claim 11, wherein the first bandwidth complies with Institute of Electrical & Electronics Engineers (IEEE) 802.16e and the second bandwidth complies with IEEE 802.16m.

18. The apparatus according to claim 11, wherein the network has a Worldwide Interoperability for Microwave Access (WiMAX) architecture.

19. The apparatus according to claim 11, wherein the first device and the second device are mobile stations or fixed stations.

20. A method comprising:
receiving with a data processor a frame for transmission over a network, the frame including a preamble to provide compatibility with a plurality of operational modes,
wherein a first portion of the preamble provides synchronization as to operate at a first bandwidth, and a second portion of the preamble provides synchronization as to operate at a second bandwidth, and where the first bandwidth and the second bandwidth are two distinct frequency bands,
where the preamble comprises a common preamble designating the same preamble for both bands in the first bandwidth,
wherein the first portion of the preamble is commonly used by the first device and the second device.

21. A non-transitory computer-readable storage medium carrying one or more sequences of one or more instructions which, when executed by one or more processors, cause the one or more processors to perform the method of claim 20.

22. An apparatus comprising:
a data processor configured to receive a frame for over a network, the frame including a preamble to provide compatibility with a plurality of operational modes,
wherein a first portion of the preamble provides synchronization as to operate at a first bandwidth, and a second portion of the preamble provides synchronization as to operate at a second bandwidth, and where the first bandwidth and the second bandwidth are two distinct frequency bands,
where the preamble comprises a common preamble designating the same preamble for both bands in the first bandwidth,
wherein the first portion of the preamble is commonly used by the first device and the second device.

* * * * *